United States Patent
Goossen et al.

[11] Patent Number: 6,073,550
[45] Date of Patent: Jun. 13, 2000

[54] ROUND BALER HAVING SAFETY BREAKAWAY LATCH FOR DISCHARGED BALE PUSHER

[75] Inventors: Lavern R. Goossen, Newton; J. Dale Anderson, Canton, both of Kans.

[73] Assignee: Hay & Forage Industries, Hesston, Kans.

[21] Appl. No.: 09/248,424

[22] Filed: Feb. 11, 1999

[51] Int. Cl.[7] .............................. A01F 15/07; A01F 15/08
[52] U.S. Cl. ................................................ 100/88; 56/341
[58] Field of Search .................... 100/87–89; 56/341; 414/24.6

[56] References Cited

U.S. PATENT DOCUMENTS

| | | | |
|---|---|---|---|
| 3,797,215 | 3/1974 | Kopaska | 56/341 |
| 4,206,587 | 6/1980 | Freimuth et al. | 100/88 |
| 4,458,587 | 7/1984 | Jennings | 100/88 |
| 4,483,247 | 11/1984 | Coeffic | 100/88 |
| 4,765,236 | 8/1988 | White | 100/88 |
| 4,779,527 | 10/1988 | Ardueser et al. | 100/88 |
| 4,798,044 | 1/1989 | Viaud et al. | 100/88 |
| 5,159,876 | 11/1992 | Olin | 100/88 |
| 5,263,410 | 11/1993 | Olin | 100/88 |

FOREIGN PATENT DOCUMENTS

| | | |
|---|---|---|
| 3607040 | 9/1987 | Germany . |
| 2-97331 | 4/1990 | Japan . |

OTHER PUBLICATIONS

Hesston Pilot Production Operator's Manual, 545 Round Baler, Form No. 700 716 023, front and back cover sheets; pp. 1 and 114 (1996).

*Primary Examiner*—Stephen F. Gerrity
*Attorney, Agent, or Firm*—Hovey, Williams, Timmons & Collins

[57] ABSTRACT

The bale pusher mechanism of a round baler has a one-way safety breakaway latch between the push bar that engages the ejected bale and the actuator that operates the push bar. During the pushing stroke of the push bar, the latch cannot unlock, but during the return stroke if the push bar hangs up on the bale for any reason, the relief spring of the latch can yield to allow the push bar to disconnect itself from the actuator and remain engaged with the bale. As the baler is driven forwardly a short distance with the tailgate raised, the unlatched push bar rides harmlessly across the top surface of the bale until it completely clears the bale. In most cases the push bar will then easily relatch itself with the actuator by gravity.

9 Claims, 3 Drawing Sheets

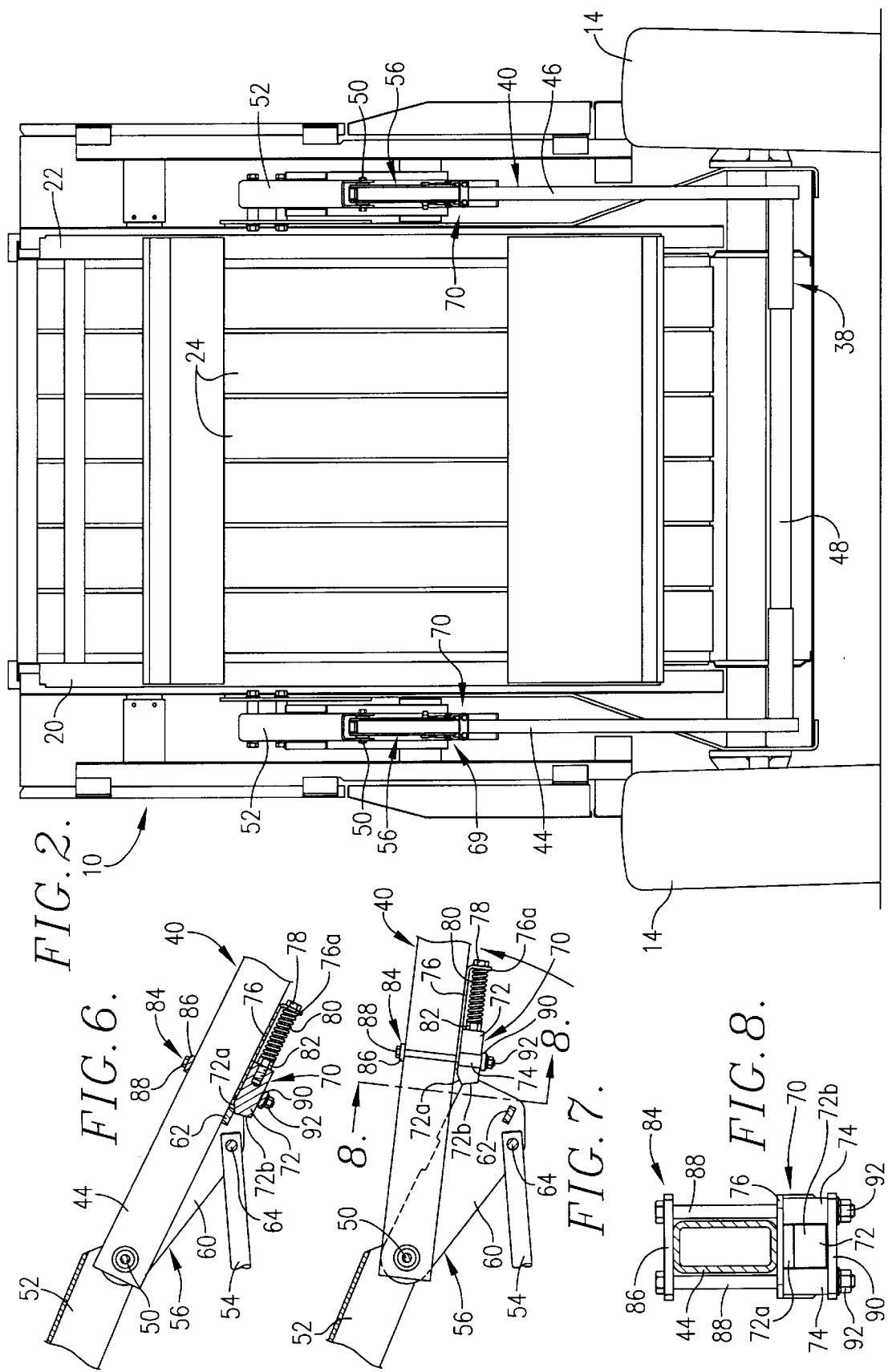

ROUND BALER HAVING SAFETY BREAKAWAY LATCH FOR DISCHARGED BALE PUSHER

TECHNICAL FIELD

The present invention relates to round balers and, more particularly, to a repositioner or "pusher" mechanism for moving a bale away from the baler once the bale has been discharged from the baler onto the ground. An example of such a pusher is disclosed in U.S. Pat. No. 4,765,236 assigned to the owner of the present application.

BACKGROUND

The '236 patent discloses the use of an interlock mechanism for preventing actuation of the bale pusher until such time as the bale has been dumped from the chamber onto the ground. Thus, unless the bale has left the chamber, the sensor of the interlock mechanism does not allow the pusher to be operated, even though the tailgate has been fully raised. This prevents the pusher from accidentally being operated before the bale comes out, which could otherwise enable the bale to leave the chamber after the pusher was fully extended and to become trapped between the extended pusher and the frame of the baler. Although the interlock mechanism normally performs quite well, in certain crop conditions the bale may emerge from the bale chamber so slowly that, even though the sensor of the interlock may have been tripped, the bale does not reach the ground before the pusher actuates.

SUMMARY OF THE INVENTION

Therefore, in addition to, or as an alternative to, the interlock mechanism of the '236 patent, the present invention contemplates a pusher mechanism in which the push bar that might possibly become trapped behind the bale has a safety breakaway latch that permits the push bar to temporarily disconnect itself from the actuator portion of the mechanism and ride harmlessly up and over the bale as the baler is pulled forward. Once the bale is cleared by the pusher, the push bar can return to its latched position by gravity or, if need be, the operator can easily manually reset the bar.

Thus, one important object of the present invention is to provide a pusher which avoids damage to itself and other components of the baler in the event the pusher is prematurely actuated, i.e., before the bale leaves the chamber, trapping the bale between the push bar and the rear of the opened baler.

Another important object of the present invention is to provide a pusher having a powerful pushing stroke capable of readily moving and retaining a big bale out from underneath the raised tailgate, yet which requires only a relatively low amount of resistance during its return stroke before the push bar breaks away from the actuator to relieve forces in the system that would otherwise cause damage.

Another important object of the present invention is to provide such a pusher that is easily reset into its normal operating configuration once the faulty bale discharge sequence and improper positioning of the bale have been dealt with.

A still further important object of the present invention is to provide a relatively inexpensive, yet reliable mechanical safety breakaway latch arrangement for the push bar of a round bale pusher.

These and other important objects of the present invention will become apparent from the detailed description which follows.

BRIEF DESCRIPTION OF THE DRAWINGS

FIG. 2 is a rear elevational view thereof;

FIG. 6 is an enlarged, fragmentary left side elevational view of the pusher in its fully actuated position corresponding to the solid line position of FIG. 3 with parts removed and shown in cross-section for clarity;

FIG. 7 is a side elevational view similar to FIG. 6 but illustrating the push bar unlatched from the actuator, corresponding to the phantom line position of the swing in FIG. 3; and FIG. 8 is a slightly enlarged, transverse cross-sectional view through one arm of the pusher swing taken substantially along line 8—8 of FIG. 7.

DETAILED DESCRIPTION

Figures 1, 4, 5:
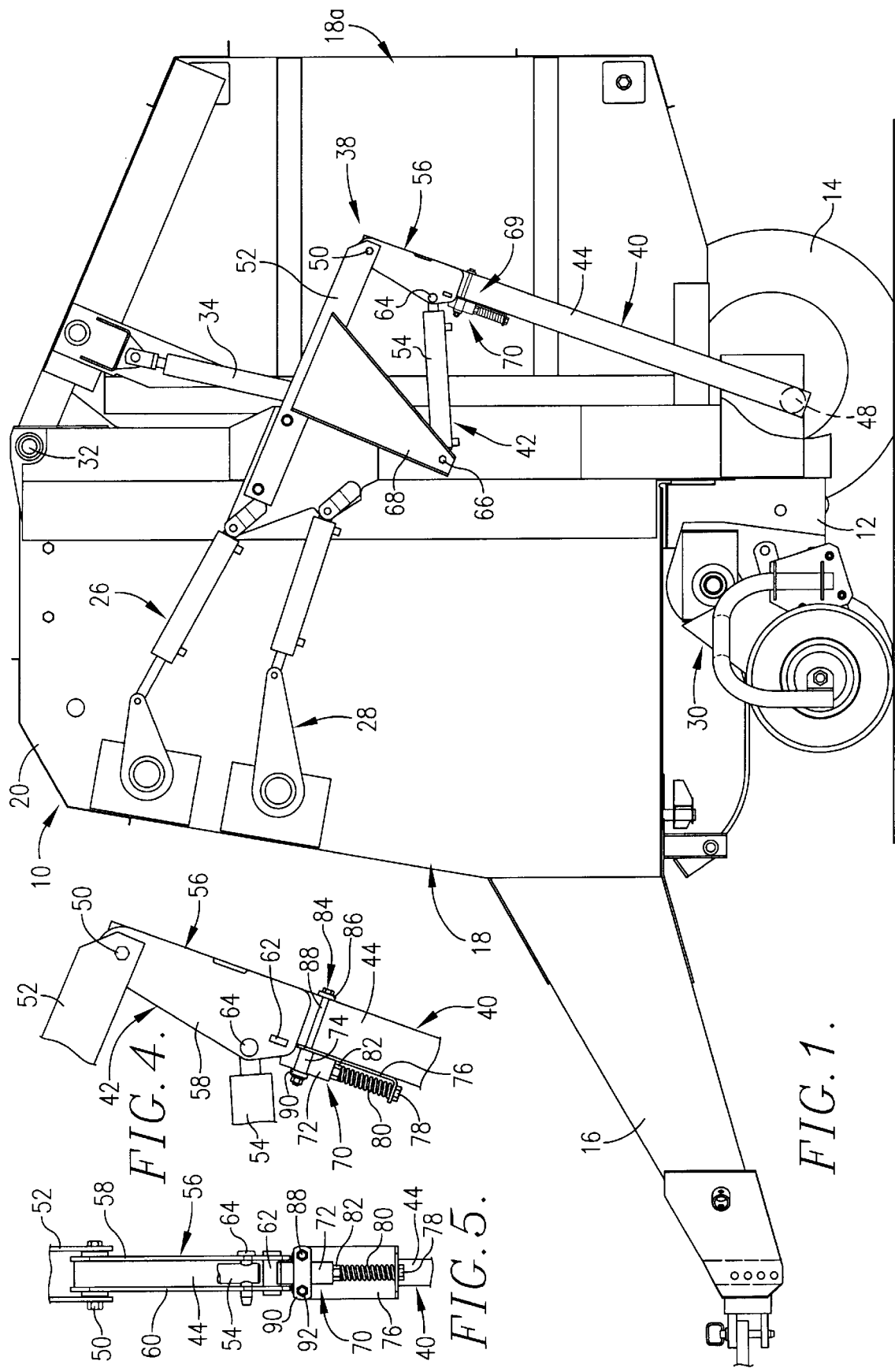
FIG. 1 is a left side elevational view of a round baler incorporating a pusher having a safety breakaway latch in accordance with the principles of the present invention, the left ground wheel of the baler being removed for clarity.
FIG. 4 is an enlarged fragmentary side elevational view of the left side of the baler in the FIG. 1 position and showing the push bar of the pusher mechanism fully latched to the actuator of the mechanism.
FIG. 5 is a fragmentary front elevational view of the structure shown in FIG. 4.

The baler 10 includes a chassis 12 supported by a pair of ground wheels 14. A tongue 16 is fixed to the chassis 10 and extends forwardly therefrom for attaching the baler 10 to a towing vehicle (not shown).

The chassis 12 supports a housing denoted broadly by the numeral 18 that includes a pair of upright, laterally spaced sidewalls 20 and 22 cooperating to partially define a baling chamber within the baler. A series of forming belts 24 (FIGS. 2 and 3) within the chamber and between the sidewalls 20,22 also cooperate with one another and with the sidewalls 20,22 to render the baling chamber. As well understood by those skilled in the art, the belts 24 are entrained around a plurality of transverse rollers that span the sidewalls 20,22 to render the baling chamber initially relatively small, but allow it to progressively grow larger as a bale forms and forces the belt to deflect diametrically.

The belts 24 are continuously driven during the forming cycle so that the bale is rolled by the belts within the chamber to cause incoming hay to coil up on the bale. Slack to the belts for the purpose of enabling them to progressively enlarge the chamber is controlled by a hydraulic slack control mechanism broadly denoted by numeral 26, while tension on the belts and the bale and the bale is controlled by a hydraulic tension control system broadly denoted by the numeral 28.

As the baler 10 is pulled across a field, a pick-up 30 near the front of the machine lifts crop material off the field and directs it toward the baling chamber. The incoming hay is received by the moving belts 24, which coil it into a dense bale.

Figure 3:
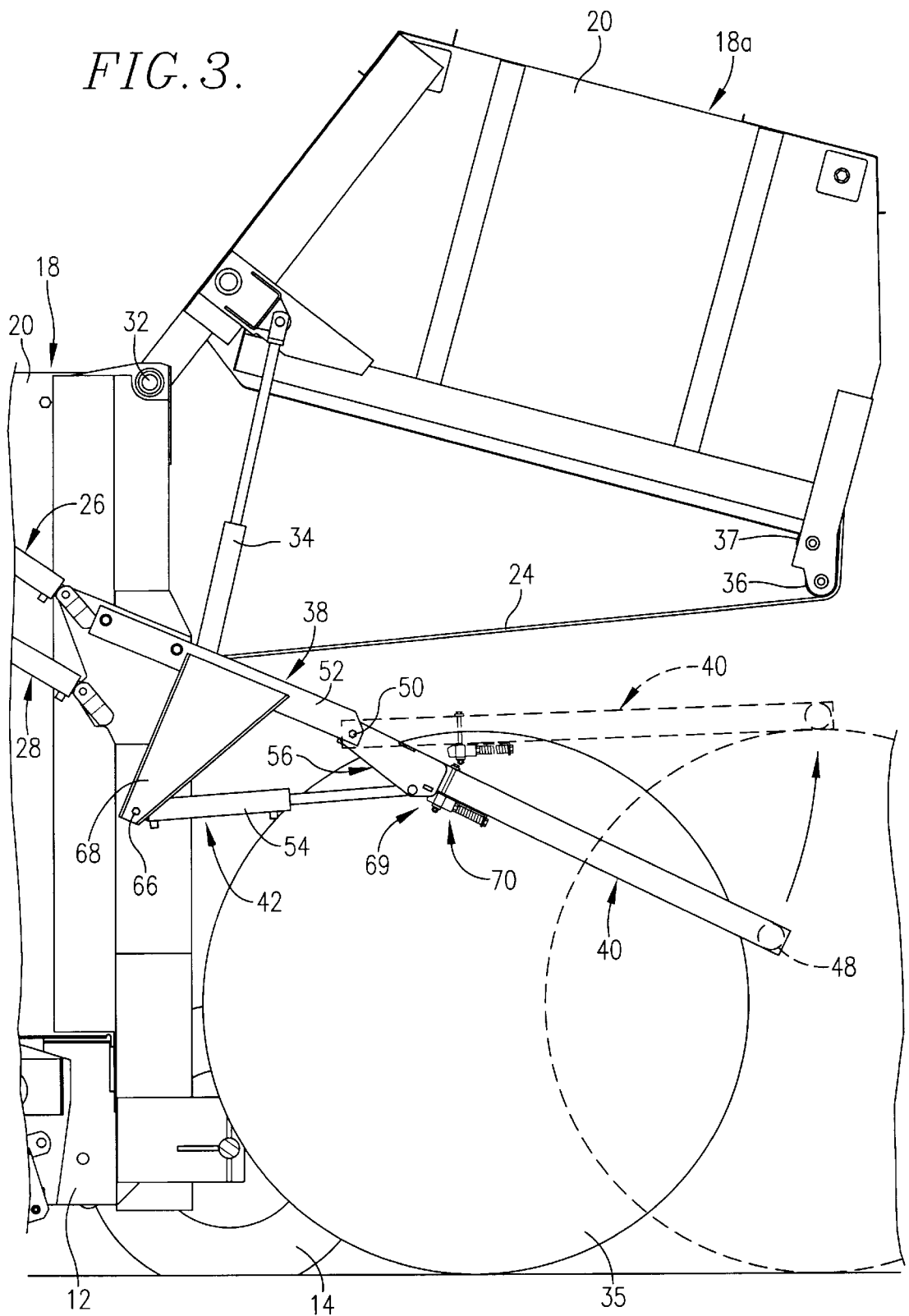
FIG. 3 is a fragmentary left side elevational view of the baler during the course of bale ejection with the left ground wheel removed and illustrating the breakaway action of the pusher.

The rear half of the housing 18 is hinged to the front half about an upper transverse pivot 32. This enables the rear portion of the housing to serve as a tailgate 18a as illustrated in FIG. 3 so that when the tailgate is raised, the finished bale 35 may fall out of the bale chamber onto the ground. A hydraulic lift cylinder 34 is used for opening and closing the tailgate. Preferably, the internal baling chamber is so situated that the center of gravity of the finished bale 35 is slightly behind the tailgate rollers 36 and 37 (FIG. 3) that help support the bale within the chamber. Thus, when the tailgate is raised and the tailgate rollers 36,37 are removed from underneath the bale, the bale drops out of the chamber and onto the ground.

As shown in FIG. 3, when the bale drops out of the chamber, it is initially directly underneath the opened tailgate. Therefore, either the baler needs to be pulled forward or the bale must be pushed rearwardly in order to avoid interference between the tailgate and the bale as the tailgate is closed. To this end, the baler has a pusher mechanism broadly denoted by the numeral 38. Broadly speaking, the pusher 38 includes two main parts, i.e., a push bar broadly denoted by the numeral 40 and an actuator broadly denoted by the numeral 42. As explained hereinbelow, in the event that a bale becomes trapped under the push bar 40 during the discharge sequence, the push bar 40 can self-disconnect or "breakaway" from the actuator 42 so as to prevent damage during the return stroke.

The push bar 40 takes the form of a generally U-shaped swing having a pair of generally upright arms 44,46 and a transverse crosspiece 48 that interconnects the arms 44 and 46 at their lower ends. The arms 44 and 46 are disposed outboard of the respective sidewalls 20,22, while the crosspiece 48 spans the sidewalls beneath the tailgate 18a portion of the baler.

The push bar 40 is swingably connected to the housing 18 by a pair of transverse horizontal pivots 50 on opposite sides of the baler. The pivots 50 are located at the lower rear ends of a pair of downwardly and rearwardly inclined support members 52 on opposite sides of the baler, each support member being rigidly affixed to the chassis 12 in such a manner that the support member is spaced slightly outwardly from the corresponding sidewall 20 or 22 so as to avoid interference with the tailgate as it opens and closes. Each support member 52 is cantilevered so that its lower rear end juts back beyond the stationary front portion of the housing 18 to locate the pivots 50 at a point disposed rearwardly of the crosspiece 48 when the push bar 40 is in its home position as illustrated in FIG. 1. This allows the crosspiece 48 to have a significant amount of generally horizontal rearward travel when the push bar 40 is initially actuated during the pushing stroke.

The actuator 42 of the pusher mechanism 38 includes a pair of double-acting hydraulic cylinders 54 (only one being shown) on opposite sides of the baler and a pair of brackets 56 swingably attached to the support members 52 by the same pivots 50 used for the push bar 40. As illustrated in FIGS. 4 and 5 in particular, each bracket 56 includes a pair of plates 58 and 60 that are located on opposite sides of the arm 44 or 46 and which can swing about the pivot 50 relative to such arm. The two plates 58 and 60 are connected together adjacent their lower ends by a rigid, transverse shoulder 62 that serves to tie the plates 58,60 structurally together so that they move as a unit during swinging about the pivot 50. A transverse pivot pin 64 spanning the plates 58 and 60 a short distance above the shoulder 62 serves as a pivotal anchor for the rod end of the cylinder 54. The opposite, front end of the cylinder 54 has a pivotal connection 66 with a triangular mounting plate 68 that is rigidly affixed to and projects downwardly and forwardly from the corresponding cantilevered support member 52.

The push bar 40 and the actuator 42 of the pusher mechanism 38 are releasably and operably interconnected by a one-way safety breakaway latch broadly denoted by the numeral 69. In the preferred embodiment the breakaway latch 69 includes a pair of identical latch assemblies 70 on opposite sides of the baler. Each latch assembly 70 is associated with a respective one of the swing arms 44 and 46 so as to releasably couple the bracket 56 with the corresponding arm 44 or 46. As shown in detail in FIGS. 6–8, each latch assembly 70 primarily includes a spring-loaded catch 72 on the push bar 40, and the shoulder 62 on the bracket 56. The catch 72 is trapped laterally between a pair of spacers 74 on the arm, but the spacers 74 only confine the catch 72 laterally and do not prevent longitudinal movement along the arm. Each catch 72 slides against a generally L-shaped wear plate 76 on the proximal surface of the corresponding arm 44 or 46. The wear plate 76 has an outturned flange 76a that serves to receive a bolt 78 threaded into the end of the catch 72 such that the bolt 78 and the catch 72 are joined together as a unit. A relief spring 80 encircles the bolt 78 and is trapped between the outturned flange 76a and a keeper nut 82 abutting the rear of the catch 72 on the bolt 78.

The catch 72 and its relief spring 80 and associated hardware are attached to the corresponding swing arm 44 or 46 by a mounting assembly generally denoted by the numeral 84. The mounting assembly 84 includes a rigid strap 86 across the backside of the corresponding swing arm, a pair of bolts 88 on opposite sides of the arm 44 or 46, a second transverse rigid strap 90 below the spacers 74, and a pair of nuts 92 at the threaded ends of the bolts 88. The bolts 88 pass freely through the straps 86 and 90, as well as the spacers 74 and the wear plate 76, and the nuts 92 serve to draw the components of the assembly generally toward one another so as to tightly clamp the arm between the strap 86 on the one hand and the wear plate 76 on the other hand. Although the nuts 92 are snugly threaded onto the bolts 88 up against the strap 90, the spacers 74 prevent the catch 72 from becoming tightly clamped between the slide plate 76 and the strap 90. Thus, the catch 72 is confined by the wear plate 76, the spacer 74 and the strap 90 but is not prevented from sliding movement in a longitudinal direction along the corresponding arm 44 or 46.

As illustrated in FIG. 6, the relief spring 80 urges the catch 72 away from outturned flange 76a into an extended, locked position, although the spring 80 can yield under a sufficiently applied force tending to compress the spring 80 so as to allow the catch 72 to shift back toward the flange 76a. In its locked position of FIG. 6, the catch 72 is disposed to locate its beveled nose 72a behind the shoulder 62 when the arm 44 is fully received between the plates 58 and 60 of the bracket 56. The arms 44 and 46 seat against the shoulders 62 when the arms 44 and 46 are fully received within the brackets 56. A reset cam surface 72b on the nose of the catch 72 below the bevel 72a serves to help reset or relock the latch assembly 70 when the push bar 40 is relatched to the actuator 42 after breakaway.

In one embodiment of the invention the tailgate cylinders 34 and the pusher cylinders 54 may be connected in such a hydraulic circuit arrangement that during the bale discharging cycle, the tailgate rises to its fully raised position in FIG. 3, followed by automatic actuation of the pusher 38. By this time, if the finished bale has fallen out of the chamber, actuation of the push bar 40 by the hydraulic cylinders 54 will cause the crosspiece 48 to engage the bale at its lower front extremity and exert a rearward pushing force against the bale that causes it to roll rearwardly out from under the tailgate. Thereupon, the tailgate can be lowered back to its closed position of FIG. 1. Once the tailgate is closed, the cylinders 54 may be retracted (automatically if desired) to return the push bar 40 back to its home position of FIG. 1.

During a normal bale discharge sequence, the push bar 40 remains operably secured to the actuator 42 by the latch assemblies 70 of latch 69. As the push bar 40 swings rearwardly and upwardly against the bale, the resistance of the bale applies a downwardly and generally forwardly directed force against the crosspiece 48. However, because the arms 44 and 46 of the push bar 40 bear against the shoulders 62 within the brackets 56 during the pushing stroke, the push bar 40 cannot break away from the actuator 42 and pivot about the pivots 50 relative to the brackets 56.

During the return stroke of the push bar 40, the catches 72 normally remain underneath the shoulders 62 so that the push bar 40 moves as a unit with the brackets 56 and the retracting cylinders 54. If for any reason the pusher 38 is actuated before the bale falls out of the chamber, the push bar 40 may become disposed on the rear side of the bale and trap the bale against the chassis of the baler. Typically, the operator will notice that this malfunction has occurred. At that time, before lowering the tailgate, he simply pulls the baler forward a short distance, causing the bale to exert an upwardly directed resistance force against the push bar 40, i.e., in a counterclockwise direction viewing FIG. 3. This resistance force is directed from the push bar 40 into the catches 72, and then from the beveled surfaces 72a of the catches 72 against the shoulders 62. Thus, the catches 72 tend to retract against the action of the relief springs 80.

When the force becomes great enough, the relief springs 80 yield and the catches 72 are depressed far enough by the shoulders 62 to allow the catches 72 to slip past the shoulders 62 as the push bar 40 rises. Once the latch assemblies 70 are released, the push bar 40 is completely free to swing upwardly about the pivots 50 relative to the brackets 56 to a clearance position such as shown in phantom in FIG. 3. Continued forward movement of the baler thus simply causes the crosspiece 48 of push bar 40 to drag harmlessly across the top of the bale until it clears the bale sufficiently that the push bar may swing by gravity back down to its latched position.

As the disconnected push bar 40 clears the front side of the bale and swings down by gravity toward the brackets 56, the reset surfaces 72b of the catches 72 come into engagement with the shoulders 62 of the brackets 56. Depending upon the momentum of the push bar 40 as it moves clear of the bale, this motion may be sufficient to cause the shoulders 62 to cam the catches 72 rearwardly a sufficient extent as to enable the catches to slip past the shoulders 62 and automatically reset themselves in the latched condition. If the push bar 40 does not automatically relatch, the operator can easily walk back to the rear of the machine and pull down on the crosspiece 48 to reset the latch 69, whereupon the tailgate may be lowered and the pusher 38 once again returned to its home position of FIG. 1.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. In a round baler having a housing within which a bale is formed and a tailgate that may be opened to discharge the bale onto the ground after formation is complete, an improved pusher mechanism for moving the discharged bale out from under the tailgate and retaining the bale out of the path of travel of the tailgate as it returns to its closed position comprising:

a push bar swingably attached to said housing for fore-and-aft movement about a horizontal transverse axis with respect to the normal path of travel of the baler through pushing and return strokes;

an actuator capable when coupled with the push bar of moving the push bar in said strokes; and a break-away safety latch releasably coupling said actuator with the push bar, said latch including a relief spring yieldably biasing a catch of the latch into a locked position but capable upon the exertion of a predetermined resistance from the push bar during the return stroke of allowing the catch to shift out of said locked position to release the push bar from the actuator.

2. In a round baler as claimed in claim 1, said actuator including a connecting bracket separate from the push bar but connectable with the push bar by said latch, said bracket being swingable about said horizontal axis of swinging movement of the push bar.

3. In a round baler as claimed in claim 2, said latch including a shoulder on the bracket, said catch and said relief spring being on the push bar.

4. In a round baler as claimed in claim 3, said actuator including a hydraulic cylinder operably connected between the housing and the bracket.

5. In a round baler as claimed in claim 3, said catch having a reset cam surface engageable with the shoulder during relatching of the push bar to the actuator and configured to cause the shoulder to yieldably depress the catch against the action of the relief spring until the push bar is fully received by the bracket.

6. In a round baler as claimed in claim 1, said actuator including a pair of connecting brackets on opposite sides of the baler separate from the push bar but connectable with the push bar by said latch, said brackets being swingable about the same horizontal axis of swinging movement as the push bar, said latch including a pair of latch assemblies on opposite sides of the baler operably engageable with respective ones of said brackets.

7. In a round baler as claimed in claim 6, said actuator further including a pair of hydraulic cylinders on opposite sides of the baler operably connected between the housing and a respective bracket.

8. In a round baler as claimed in claim 7, each of said latch assemblies including one of said catches, one of said relief springs, and a shoulder on the corresponding bracket, said catches and said relief springs being on the push bar.

9. In a round baler as claimed in claim 8, each of said catches having a reset cam surface engageable with the corresponding shoulder during relatching of the push bar to the actuator and configured to cause the shoulder to yieldably depress the catch against the action of the relief spring until the push bar is fully received by the bracket.

* * * * *